(12) United States Patent
Hong

(10) Patent No.: US 7,085,323 B2
(45) Date of Patent: Aug. 1, 2006

(54) ENHANCED RESOLUTION VIDEO CONSTRUCTION METHOD AND APPARATUS

(75) Inventor: Li Hong, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 746 days.

(21) Appl. No.: 10/116,399

(22) Filed: Apr. 3, 2002

(65) Prior Publication Data

US 2003/0189983 A1    Oct. 9, 2003

(51) Int. Cl.
*H04N 7/18*    (2006.01)

(52) U.S. Cl. .............................. 375/240.25; 375/240.26

(58) Field of Classification Search ................ 375/240.11–240.21; 382/232–261
See application file for complete search history.

(56) References Cited

U.S. PATENT DOCUMENTS

| | | |
|---|---|---|
| 5,579,054 A | 11/1996 | Sezan et al. |
| 5,696,848 A | 12/1997 | Patti et al. |
| 5,808,695 A | 9/1998 | Rosser et al. |
| 5,969,772 A | 10/1999 | Saeki |
| 6,023,535 A | 2/2000 | Aoki |
| 6,069,668 A | 5/2000 | Woodham, Jr. et al. |
| 6,181,826 B1 | 1/2001 | Weldy et al. |
| 6,208,765 B1 | 3/2001 | Bergen |
| 6,259,828 B1 | 7/2001 | Crinon et al. |
| 6,304,682 B1 | 10/2001 | Patti |
| 6,349,154 B1 | 2/2002 | Kleihorst |
| 6,393,163 B1 * | 5/2002 | Burt et al. .............. 382/294 |
| 6,782,132 B1 * | 8/2004 | Fogg .......................... 382/232 |

OTHER PUBLICATIONS

Nimish R. Shah and Avideh Zakhor, *Resolution Enhancement of Color Video Sequences*, IEEE Transactions on Image Processing, vol. 8, No. 6, Jun. 1999, XP-002249956, pp. 879-885.

Brian C. Tom and Aggelos K. Katsaggelos, *Resolution Enhancement of Monochrome and Color Video Using Motion Compensation*, IEEE Transactions on Image Processing, vol. 10, No. 2, Feb. 2001, XP-002249957, pp. 278-287.

European Search Report dated Aug. 5, 2003 for European Application No. 03252093.

Borman, S., et al., "Super-Resolution From Image Sequences—A Review," pp. 374-378, 1999 IEEE.

Patti, A.J., et al., "Super Resolution Video Reconstruction with Arbitrary Sampling Lattices and Non-Zero Aperture Time," pp. 1-13, IEEE Transactions On Circuits and Systems for Video Technology, 1999.

(Continued)

*Primary Examiner*—Anand Rao
(74) *Attorney, Agent, or Firm*—Stephen C. Bongini; Lisa K. Jorgenson

(57) ABSTRACT

Enhanced resolution video sequence results from construction of enhanced resolution key frames and synthesis of enhanced resolution non-key frames. Key frames are constructed by processing a plurality of initial resolution frames in order to produce the enhanced resolution image components of the key frame. Non-key frames are synthesized using the enhanced resolution image component of the key frames and image component motion determinations from initial resolution frames using an image warping technique. Non-key frame image components are further improved by blending and error correction processes.

38 Claims, 5 Drawing Sheets

OTHER PUBLICATIONS

Patti, A.J., et al., "Artifact Reduction for Set Theoretic Super Resolution Image Reconstruction with Edge Adaptive Constraints and Higher-Order Interpolants," pp. 179-186, IEEE Transactions on Image Processing, vol. 10, No. 1, Jan. 2001.

Schultz, R.R., et al., "Extraction of High-Resolution Frames From Video Sequences," pp. 1-19, IEEE International Conference on Acoustics, Speech, and Signal Processing, Detroit, MI., May 8-12, 1995.

Tekalp, A.M., et al., "High-Resolution Image Reconstruction From Lower-Resolution Image Sequences and Space-Varying Image Restoration," pp. 111-169-172, IEEE 1992.

Tom B.C., et al., "Resolution Enhancement of Monochrome and Color Video Using Motion Compensation," pp. 278-287, IEEE Transactions on Image Processing, vol.10, No. 2, Feb. 2001.

\* cited by examiner

ND RESOLUTION VIDEO
CONSTRUCTION METHOD AND
APPARATUS

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

FIELD OF THE INVENTION

This invention relates to the field of digital enhancement of video images.

BACKGROUND OF THE INVENTION

Enhancements in display resolution has made it possible for many viewers to see video having resolutions greater than the initial recorded or received video images. For example, many television screens are capable of greater pixel resolution than the pixel resolution transmitted with standard broadcast programming or recorded on videotape or disc. Furthermore, many MPEG videos have display resolutions substantially lower than the display resolution of monitors presenting the video.

The advent of modern digital signal processing circuits and algorithms have resulted in processes for enhancing resolution of still images by processing a series of initial resolution images and determining differences there between. These differences are used to build enhanced resolution images having greater pixel density. The term "superresolution" (SR) image enhancement is used by those familiar with this area of the art to describe such image enhancement.

FIG. 1 shows a prior art method of generation of a high resolution still frame from a plurality of low resolution frames. The low resolution frame sequence 100 includes a plurality of temporal frames 122. The frames 122 are processed by super resolution frame processor 150 to produce a single high resolution frame 160. Frame 160 has enhanced resolution because the pixel density of frame 160 is substantially greater than the pixel density of each of frames 122 with a corresponding increase in displayed image resolution. For example the low resolution frame could be CIF resolution 352×288 pixels resulting in a density of 101,376 pixels per frame. The enhanced frame could be 704×576 pixels resulting in a density of 405,504 pixels per frame. Thus, image components have four time the pixel density in this example. Other embodiments may increase the high resolution image component pixel density even further and may limit the increase to only twice or less the low resolution pixel density. SR frame processor 150 analyzes relatively small differences between successive frames 120 which are due to motion of the image sensor or motion of image components in the scene. The differences are used to develop motion vectors with sub-pixel accuracy. The high resolution still frame 160 is then created by from the low resolution images and the motion vectors. While the SR frame processor does produce high resolution still frames, the process has a high computational load and is not optimally suited for generation of high definition video sequences.

FIG. 2 provides a more detailed example of the prior art system of FIG. 1 in applying superresolution still techniques to reconstruct a high resolution image from low resolution frames. The sequence of low resolution frames are shown at 222. The SR frame processor is shown at 250. The general scheme of the SR still technique is to first build up a system relating the low resolution frames to the desired high resolution image based on a image degradation model and the motion information, then utilize iteration methods to estimate the solution being the desired SR image. The following notations are used:

$L_t$: a low resolution at frame index (or time stamp) t.
$H_k$: a high resolution frame related to low resolution frame $L_k$.
$I_t$: an upsampled version of the low resolution frame $L_t$. It is generated by single frame interpolation techniques. Note that $I_k$ serves as the initial estimate of high resolution image $H_k$ in the iteration process to solve the SR system. Upsampled frames have the pixel density of a high resolution frame but the image resolution of a low resolution frame.
$\hat{M}^{(t \rightarrow k)}$: the estimated subpixel motion from low resolution frames $I_t$ to $I_k$. It is computed by utilizing $I_t$ and $I_k$.

In this example, high resolution image $H_k$ 260 is reconstructed by using five low resolution frames $L_t, t \in \tau_k \cup \{k\}$ where $\tau_k = \{k-2, k-1, k+1, k+2\}$ is the frame index set of the temporal related frames.

While the SR frame processor does produce high resolution still frames, the process has a high computational load and is not optimally suited for generation of high resolution video sequences.

Thus, what is needed is a method and apparatus for constructing an enhanced resolution video image that efficiently builds upon SR techniques for generation of high resolution still frames. The construction should further take advantage of the high resolution video sequence itself in order to reduce the computational loading of its construction.

SUMMARY OF THE INVENTION

The invention includes a method of producing an enhanced video image from an initial video image. The method includes the step enhancing resolution of an initial image component common to a plurality of temporal frames of the initial video image by processing the plurality of frames of the received video image to produce an enhanced image component. The method further includes the step of incorporating said enhanced image component into a plurality of temporal frames of said enhanced video image.

The invention includes a device for producing an enhanced video image from an initial video image. The device comprises a key frame generator for enhancing resolution of an initial image component common to a plurality of initial temporal frames of the initial video image by processing the plurality of initial temporal frames to produce an enhanced image component and for incorporating the enhanced image component into a key frame included within a plurality of enhanced temporal frames of the enhanced video image, the key frame corresponding to one of the plurality of initial temporal frames. The device also comprises a non-key frame generator coupled to said key frame generator for incorporating the enhanced image component into a non-key frame included within the plurality of enhanced temporal frames, the non-key frame corresponding to another of the plurality of initial temporal frames.

The invention includes a computer readable medium including computer instructions for producing an enhanced video image from an initial video image. The computer instructions include instructions for enhancing resolution of an initial image component common to a plurality of temporal frames of the initial video image by processing the plurality of frames of the received video image to produce an enhanced image component. The computer instructions also include instructions for incorporating said enhanced image component into a plurality of temporal frames of said enhanced video image.

DETAILED DESCRIPTION OF THE INVENTION

It is important to note, that these embodiments are only examples of the many advantageous uses of the innovative teachings herein. In general, statements made in the specification of the present application do not necessarily limit any of the equivalent and various claimed inventions. Moreover, some statements may apply to some inventive features but not to others. In general, unless otherwise indicated, singular elements may be in the plural and visa versa with no loss of generality.

Figure 1:
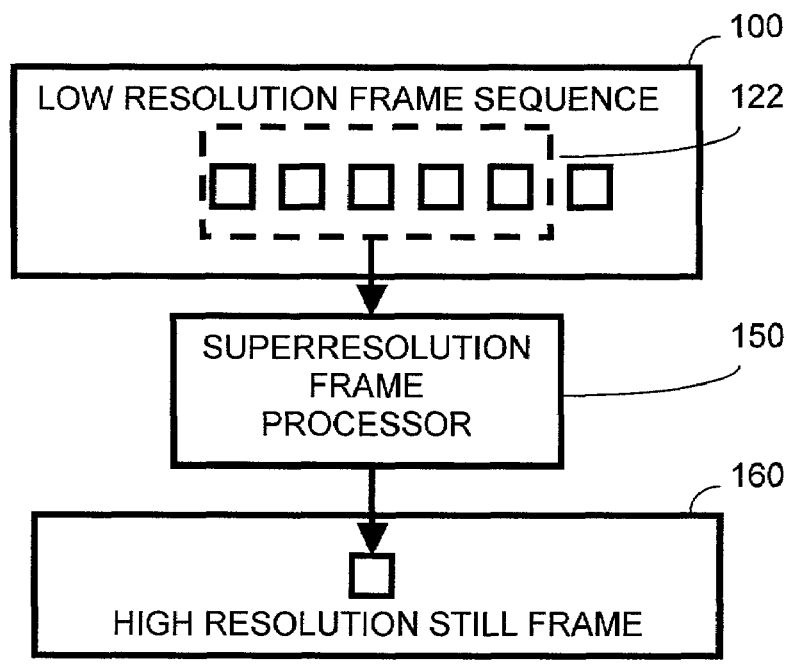
FIG. 1 shows a prior art method of generation of a high resolution still frame from a plurality of low resolution frames.
Figure 2:
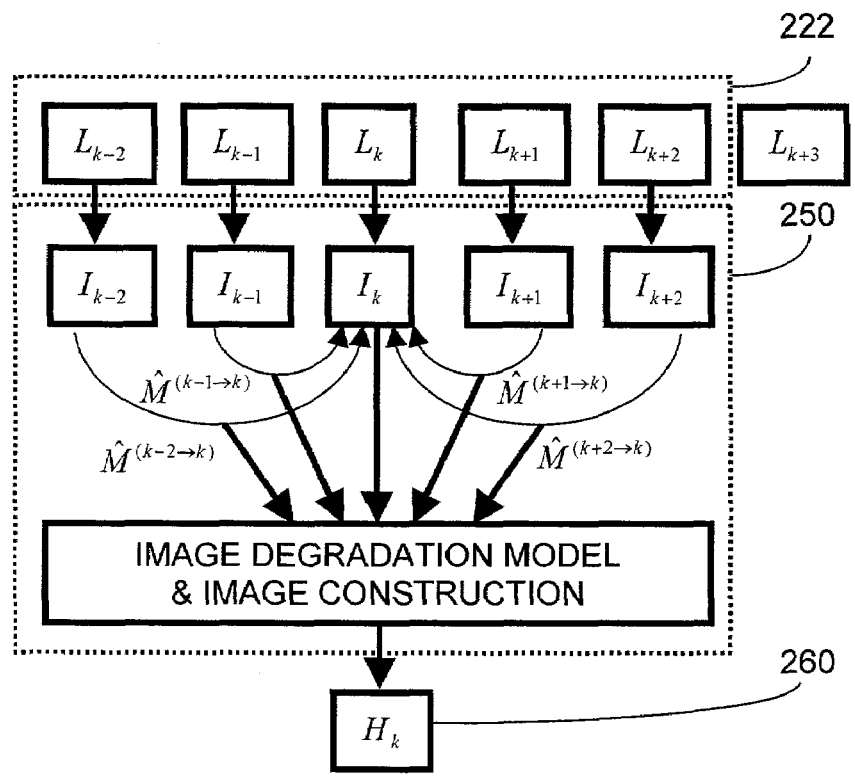
FIG. 2 provides a more detailed example of the prior art system of FIG. 1 in applying superresolution still techniques to reconstruct a high resolution image from low resolution frames.
Figure 3:
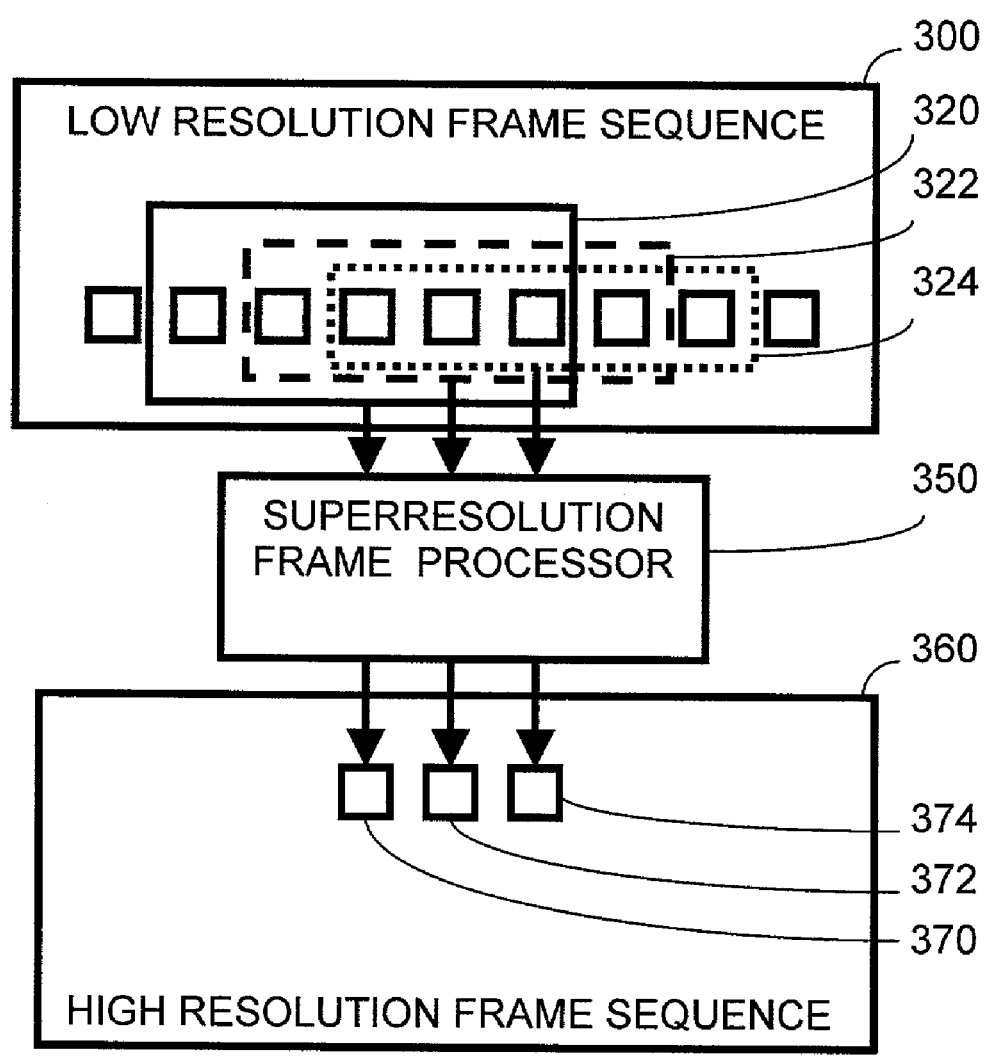
FIG. 3 shows a sliding window system for producing an enhanced high resolution video sequence from an initial low resolution video sequence in accordance with a preferred embodiment of the present invention.

FIG. 3 shows sliding window system for producing an enhanced high resolution video sequence from an initial low resolution video sequence. Low resolution video frame sequence 300 corresponds to sequence 100 or 222 with additional frames. SR frame processor 350 functions similar to SR frame processor 150 but instead of producing a single high resolution still frame, it repetitively produces high resolution frames to produce video sequence 360. The high resolution frame sequence 360 is shown to comprise 3 high resolution frames 370, 372 and 374. High resolution frame 370 is constructed from low resolution frames in window 320 by SR frame processor 350 as described with respect to FIG. 1 and FIG. 2. High resolution frame 372 is constructed from low resolution frames in window 322 by SR frame processor 350. High resolution frame 374 is constructed from low resolution frames in window 324 by SR frame processor 350. Frames 370, 372 and 374 produce a temporal image sequence for display of a high resolution video sequence. Windows 320, 322, and 324 illustrate the sliding window used to construct high resolution frames. By continuously processing a low resolution video 300 with a sliding window, a high resolution video 360 may be constructed wherein there is substantially one high resolution frame for each low resolution frame. Referring back to FIG. 2, a more detailed description is provided for construction of a high resolution video of FIG. 3 follows. If image 372 corresponds to $H_k$, then the high resolution image $H_{k+1}$ is reconstructed by processing temporal low resolution frames $L_t(t \epsilon \tau_{k+1} \cup \{k+1\})$ through the same high resolution still technique for reconstructing $H_k$. Here $\tau_{k+1} = \{k-1, k, k+2, k+3\}$. The sliding window is moved forward/backward to produce other high resolution images in the high resolution video. However, the sliding window method of constructing a high resolution sequence has significant additional computational loading, because generation of each high resolution frame 370, 372 and 374 is itself a large computational load. Thus, what is further needed is system for producing enhanced resolution video with reduced computational loading.

The invention reduces the computational loading of high resolution video construction by construction fewer "key frames" using the superresolution frame processor and synthesizing non-key frames using techniques requiring less computational loading. Non-key frames incorporate high resolution image components generated in key frames. Thus, a high resolution image component is incorporated into a plurality of temporal frames such as the high resolution key frame and at least one high resolution non-key frame.

Figure 4:
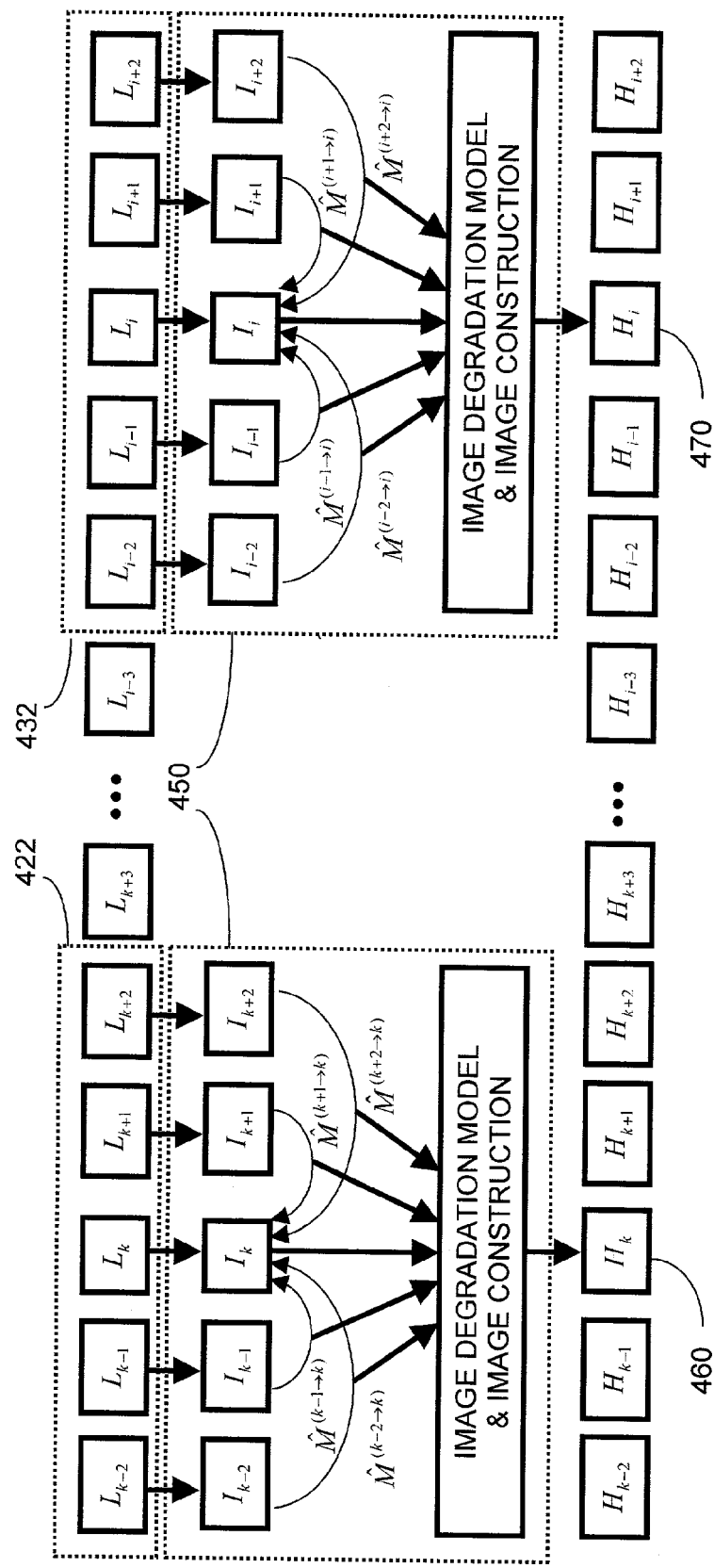
FIG. 4 shows key frame construction of some of the frames of the high resolution video sequence in accordance with a preferred embodiment of the present invention.

FIG. 4 shows key frame generation of some of the frames of the high resolution video sequence in accordance with the present invention. The low resolution sequence is shown by frames $L_{k-1}$ through $L_{i+2}$ and the high resolution video sequence is shown by frame $H_{k-2}$ through $H_{i+2}$ where $H_k$ and $H_i$ represent high resolution key frames corresponding to low resolution frames $L_k$ and $L_i$ generated from the corresponding upsampled frames $I_k$ and $I_i$. Low resolution frames in windows 422 and 432 are processed by superresolution frame processor 450 to construct high resolution frames 460 and 470. More generally, for a given low resolution sequence $L_j (j=0, \ldots, N)$, a simple example of key frame indexes can be chosen as $k=\{2,7,12, \ldots\}$. This selection is applied to the case that five low resolution frames are used to construct a high resolution key frame through existing SR still techniques. It can be easily extended to the general case that n low resolution frames are used to restore a high resolution key frame by SR still techniques.

Figure 5:
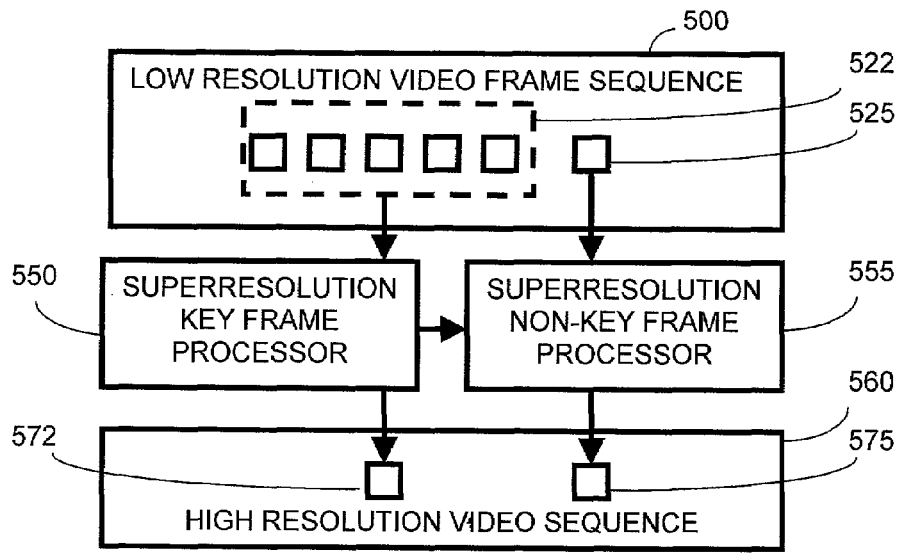
FIG. 5 shows non-key frame synthesis along with key frame construction of the high resolution video sequence in accordance with a preferred embodiment of the present invention.

FIG. 5 shows non-key frame synthesis along with key frame construction of the high resolution video sequence in accordance with the present invention. An initial video image sequence 500, which may comprise either a broadcast television image, an analog video image, a digital video image or a combination, thereof has a window 522 used by superresolution key frame processor 550 to construct a high resolution key frame 572 as previously describe. Non-key frames are synthesized by processing a low resolution frame 525 with superresolution non-key frame processor 555 along with information from the key frame processor 550 in order to produce a high resolution non-key frame 575. High resolution frames 572 and 575 represent two of the frames of high resolution video sequence which may be displayed on a high resolution display system 560. High resolution display system 560 may include a high definition television or a computer system with a high resolution CRT, LCD, projector or other type of display having a resolution greater than the resolution of low resolution frame sequence 500. The display system includes a display and corresponding display drives such as hardware, software and/or power systems used to generate images on the display that are know by those familiar with the art.

Figure 6:
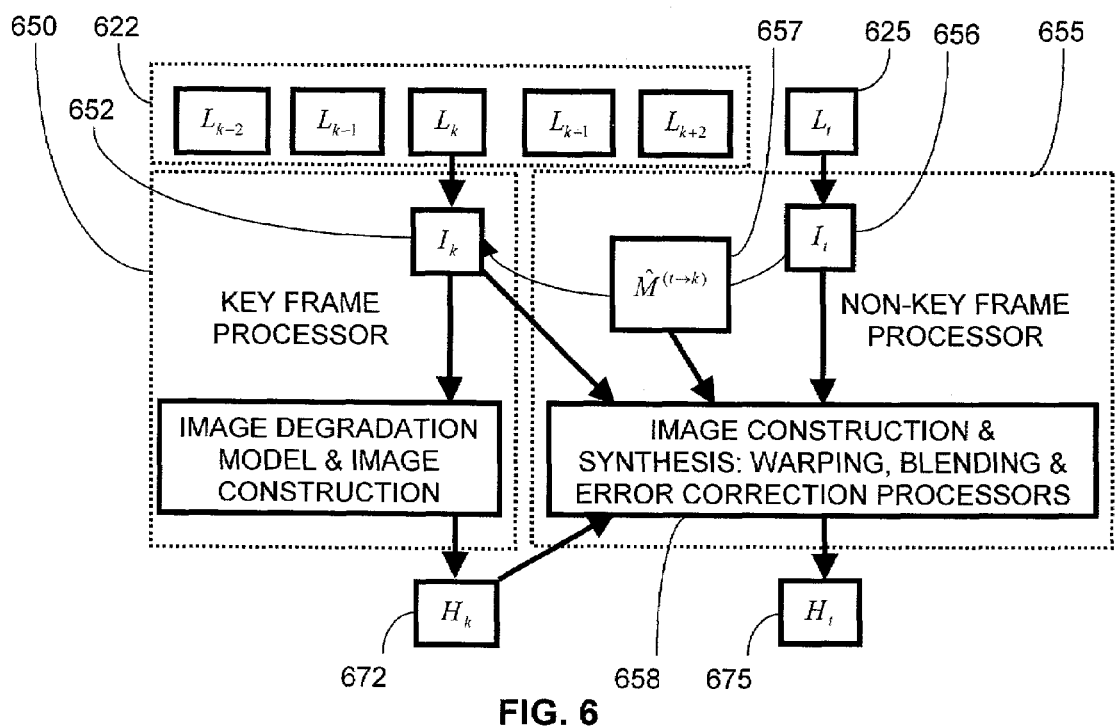
FIG. 6 shows synthesis of a non-key frame of the high resolution video sequence in accordance with a preferred embodiment of the present invention.

FIG. 6 shows synthesis of a non-key frame of the high resolution video sequence in accordance with the present invention. FIG. 6 illustrates that non-key frame processor 655 synthesizes a high resolution non-key frame 675, $H_t(t \in \tau_k)$, where t can be the index of other temporally nearby frames, by using the constructed high resolution key frame $H_k$, 672, and the motion information between $L_t$ and $L_k$. The $H_t$ is synthesized through warping image $H_k$ by the estimated subpixel motion information $\hat{M}^{(t \rightarrow k)}$ determined by motion processor 657. Warping incorporates a high resolution key frame image component into a high resolution non-key frame. Furthermore, the warping incorporation may combine blending and error correction schemes. Motion processor 657 determines the location image components in each of the upsampled images 652 and 656 in order to determine a temporal motion signal for each image component. Furthermore, it produces a motion accuracy estimation associated with each image component. This information is made available to the warping based synthesis and error correction image construction processor 658 for production of the non-key frame images 675. The image construction processor includes a warping processor and an error correction processor. Key frame synthesis involves locating image components constructed by key frame processor 650 in response to temporal motions signals from motion processor 657. Furthermore, image components from key frame processor 650 may be blended by the warping processor with image components from upsampled image 656 in response to the motion accuracy estimation of the image component. The image component may be further error corrected by the error correction processor by using additional image component information from upsampled images 652 and 656. This embodiment reduces dramatically the computational loading compared to the scheme of reapplying the SR still techniques by processor 650 on low resolution frames 622, $L_j(j=t-2,t-1,t,t+1,t+2)$ to reconstruct high resolution image $H_t$. It should be appreciated that frame $L_t$, 625, is not limited to being a frame outside of window 622 and may be either a frame inside or outside of window 622.

Assume the high resolution key frame $H_k$ has already been constructed by applying a SR still technique on low resolution frame $L_k$ and its temporal related low resolution frames $L_t(t \in \tau_k)$. A process to synthesizing the high resolution non-key frame $H_t(t \in \tau_k)$ through image warping techniques is discussed. In an ideal video case, the high resolution image $H_t$ can be obtained by applying the true subpixel motion information from $L_t$ to $L_k$, $M^{(t \rightarrow k)}$ on the constructed high resolution image $H_k$.

$$H_t = M^{(t \rightarrow k)}(H_k), \forall t \in \tau_k$$

However, the true motion information is not available. Therefore the SR image $H_t$ can be approximated by applying the estimated subpixel motion information from $L_t$ to $L_k$ ($\hat{M}^{(t \rightarrow k)}$) on the high resolution image $H_k$.

$$\hat{H}_t = \hat{M}^{(t \rightarrow k)}(H_k), \forall t \in \tau_k$$

where $\hat{H}_t$ corresponds to image warping and denotes the approximated version of high resolution image $H_t$.

The error of this approximation is:

$$E_1 = H_t - \hat{H}_t, \forall t \in \tau_k$$

Figure 7:
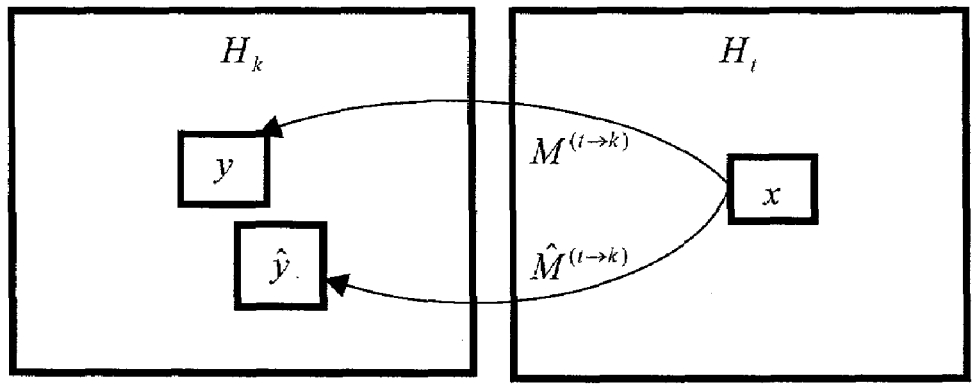
FIG. 7 shows a constructed high resolution key frame, a synthesized high resolution non-key frame and location of image components located therein in accordance with a preferred embodiment of the present invention.

FIG. 7 shows a constructed high resolution key frame, a synthesized high resolution non-key frame and location of image components located therein. More specifically, for an image component or pixel x in non-key frame $H_t$, consider y and $\hat{y}$ as the mapping image components or pixels in key frame $H_k$. In this figure, y corresponds to the true motion of x and $\hat{y}$ corresponds to the estimated motion of x.

$$y = M^{(t \rightarrow k)}(x)$$

$$\hat{y} = \hat{M}^{(t \rightarrow k)}(x)$$

Therefore, the true intensity value at pixel x in image $H_t$ is:

$$H_t(x) = H_k(y)$$

The estimated intensity value at pixel x in image $H_t$ is:

$$\hat{H}_t(x) = H_k(\hat{y})$$

which results in synthesis of an image component x of a non-key frame using image warping. The error approximation at pixel x is:

$$E_1(x) = H_k(y) - H_k(\hat{y}).$$

If the estimated motion information is accurate enough, the above approach of $\hat{H}_t(x) = H_k(\hat{y})$ gives very good results with dramatically decreased computational load compared to the 'sliding window' approach of FIG. 3. However, the robustness of the motion estimation is still a complex issue. Furthermore, the accuracy of the motion estimation decreases as the temporal distance between frames increases. Thus it is desirable to account for the issues resulting from inaccurate motion information.

Figure 8:
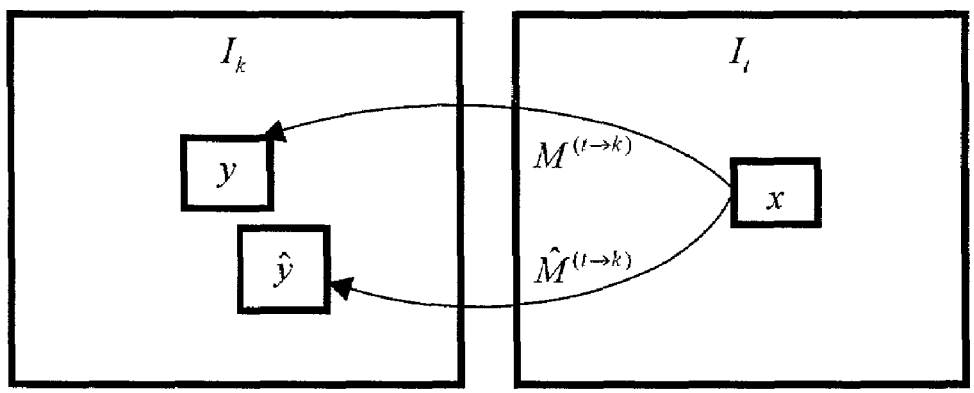
FIG. 8 shows an upsampled key frame and an upsampled non-key frame and location of image components located therein in accordance with a preferred embodiment of the present invention.

FIG. 8 shows an upsampled key frame and an upsampled non-key frame and location of image components located therein.

If motion error is out of range the image component from $I_t$ is substituted for the image component from $H_k$. That is:

$$\hat{H}_t(x) = I_t(x).$$

Thus, if the motion error component is determined within range, then warping of the key frame image component can be used where $\hat{H}_t(x) = H_k(\hat{y})$, $\hat{y} = \hat{M}^{(t \rightarrow k)}(x)$ However, if the motion error component is out of range, then substitution of the blurred non-key frame image can be used where $\hat{H}_t(x) = I_t(x)$.

If the motion error is not out of range then blending can be used. Blending is an enhancement to warping and blends the information from the initial upsampled image component $I_t$ with the corresponding image component from the high resolution key frame $H_k$. That is:

$$\hat{H}_t(x) = \omega_1 I_t(x) + \omega_2 H_k(\hat{y})$$

As previously mentioned $\omega_1+\omega_2=1$, and the more accurate the motion information the more predominant the image component from the high resolution key frame $H_k$. However, as the motion information becomes less accurate the lower resolution upsampled image component from $I_t$ becomes more predominant.

The accuracy of the motion information is judged by mean square error (MSE) or sum of absolute difference (SAD). Let $B_1$ be a small block N×N (N=5, or 7) centered at pixel x in frame $I_t$, let $B_2$ be a small block (same size as $B_1$) centered at pixel ŷ in frame $I_k$, $$MSE(B_1, B_2) = \frac{1}{N \times N} \sum_i \sum_j (B_1(i,j) - B_2(i,j))^2$$

or $$SAD(B_1, B_2) = \sum_i \sum_j |B_1(i,j) - B_2(i,j)|$$

The smaller MSE or SAD, the more accurate motion estimation at pixel x; and vice versa. Weight coefficients $\omega_1$ and $\omega_2$ can be computed as follows:

$$\omega_2 = \frac{T_1}{MSE} \text{ or } \frac{T_2}{SAD},$$

$\omega_1 = 1 - \omega_2$

Here $T_1$ or $T_2$ is a small threshold, when MSE<$T_1$ or SAD<$T_2$, the motion estimation is assumed accurate.

The warped image component $\hat{H}_t(x)$ may be further improved with a weighted error correction factor $\Delta H_t(x)$. Error correction is preferably used where $\omega_1 \approx 0$. Error correction results in an error corrected image component $\tilde{H}_t(x)$ where $\tilde{H}_t(x) = \hat{H}_t(x) + \Delta H_t(x)$ and $\Delta H_t(x) = \omega(I_t(x) - I_k(\hat{y}))$.

The error correction arise from the presumption that the true motion of an image component from $H_t$ to $H_k$ is substantially the same as the motion of the image component from $I_t$ to $I_k$. $\Delta H_t(x)$ provides for pixel or image component intensity adjustments. The value $\omega$ is a weighing factor for determining the amount of error correction applied. In order to determine $\omega$ for a minimal error an error term is defined.

$E_2(x) = H_t(x) - \tilde{H}_t(x) = (H_k(y) - H_k(\hat{y})) - \omega(I_k(y) - I_k(\hat{y}))$ Ideally if $E_2 = 0$, then $$\omega = \frac{H_k(y) - H_k(\hat{y})}{I_k(y) - I_k(\hat{y})}$$

However, the true mapping of image component y in $H_k$ for image component x in $H_t$ is not available, thus two alternative ways to reduce $E_2$ are described.

In the first alternative, let $\omega = 1$. This arises from the assumption that the changes of intensity value at image component y and ŷ between the initial upsampled image $I_k$ and the high resolution image $H_k$ are similar. That is:

$H_k(y) \approx I_k(y) + \alpha$ and $H_k(\hat{y}) \approx I_k(\hat{y}) + \alpha$ thus $\omega \approx 1$.

This results in an error corrected and blended image component of:

$\tilde{H}_t(x) = \hat{H}_t(x) + I_t(x) - I_k(\hat{y})$.

In the second alternative, let $$\omega = \frac{H_k(\hat{y})}{I_k(\hat{y})}.$$

This arises from the assumption that changes of the intensity value an image components y and ŷ between the initial upsampled image $I_k$ and the high resolution image $H_k$ can be approximated by scalar c. That is:

$H_k(y) \approx c I_k(y)$ and $H_k(\hat{y}) \approx c I_k(\hat{y})$ thus $$\omega \approx c \approx \frac{H_k(\hat{y})}{I_k(\hat{y})}.$$

This results in an error corrected and blended image component of:

$$\tilde{H}_t(x) = \hat{H}_t(x) + \frac{H_k(\hat{y})(I_t(x) - I_k(\hat{y}))}{I_k(\hat{y})}.$$

It should be further noted that c can alternately be chosen to extend $$\frac{H_k(\hat{y})}{I_k(\hat{y})}$$

to an image component that includes a small neighborhood around ŷ.

Thus, what is provided is a method and apparatus for constructing an enhanced resolution video image that efficiently builds upon SR techniques for generation of high resolution still frames. The construction further takes advantage of the high resolution video frame sequence itself in order to reduce the computational complexity of its construction. Key frames are generated using SR techniques. Non-key frames are generated using image warping. Image warping further improved using blending and error correction techniques.

According to the inventive principles as disclosed in connection with the preferred embodiment, the invention and the inventive principles are not limited to any particular kind of computer system but may be used with any general purpose computer, as would be known to one familiar with the art, arranged to perform the functions described and the method steps described. The operations of such a computer, as described above, may be according to a computer program contained on a medium for use in the operation or control of the computer, as would be known to one familiar with the art. The computer medium that may be used to hold or contain the computer program product, may be a fixture of the computer such as an embedded memory or may be on a transportable medium such as a disk, as would be known to one familiar with the art.

The invention is not limited to any particular computer program or logic or language, or instruction but may be practiced with any such suitable program, logic or language, or instructions as would be known to one familiar with the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Furthermore, the invention may be embodied in an electrical circuit receiving low resolution signals and producing high resolution signals. As an example, circuit may be included within as a set-top-box interposed between a television monitor display for displaying the superresolution image and a signal source such as an antenna, cable TV system, VCR or satellite receiver. The set top box is detachable and removable because the it may be decoupled from the display and signal source, thereby facilitating display of non-superresolution video. Alternately the electrical circuit may be included within a printed circuit board. The printed circuit board may be installed within a television, personal computer having a standard connector for accessory cards or other image display system. In another example the electrical circuit may be included in one or more integrated circuits such as application specific integrated circuits, custom integrated circuits or arrangements of off-the-shelf integrated circuits (including microprocessors) or combinations thereof. Furthermore, the invention may be incorporation into a combination of one or more electrical circuits and computer readable information, instructions or software.

Although a specific embodiment of the invention has been disclosed. It will be understood by those familiar with the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention. For example, an image component is preferably associated with a high resolution pixel, but could alternately refer to a grouping of high resolution pixels or one or more sub-pixels of a higher resolution image portion.

What is claimed is:

1. A method of producing an enhanced video image from an initial video image, the method comprising the steps of:
    enhancing resolution of an initial image component common to a plurality of temporal frames of the initial video image by processing the plurality of frames of the received video image to produce an enhanced image component, wherein the plurality of temporal frames of the enhanced video image includes a key frame corresponding to one of the plurality of temporal frames of the initial video image;
    substituting said enhanced image component within the key frame at a location corresponding to a location of the initial image component within the one of the plurality of frames of the initial video image;
    determining a movement of the initial image component between the one of the plurality of temporal frames of the initial video image and another of the plurality of temporal frames of the initial video image corresponding to a non-key frame and producing a temporal motion signal in response thereto, and
    including said enhanced image component within the non-key frame of the plurality of temporal frames of the enhanced video image by locating said enhanced image component within the non-key frame in response to the location of the enhanced image component within the key frame and the temporal motion signal.

2. The method according to claim 1, wherein the plurality of temporal frames of said enhanced video image include frames $H_k$ and $H_t$, and the enhanced video image component corresponds to $H_k(\hat{y})$ and further wherein
    said step of incorporating incorporates said enhanced image component $H_k(\hat{y})$ in both frames $H_k$ and $H_t$.

3. The method according to claim 1, wherein the initial video image corresponds to one of a group consisting of a broadcast television image, an analog video image, a digital video image and a combination thereof.

4. The method according to claim 1, wherein the initial video image comprises a multiplicity of frames, each frame having a first pixel density, and the enhanced video image comprises a corresponding multiplicity of frames, each frame have a second pixel density at least twice the first pixel density.

5. The method according to claim 1 wherein said step of enhancing further comprises the steps of:
    determining a motion of the image component between each of the plurality of temporal frames of the initial video image; and
    enhancing resolution of the initial image component in response thereto, thereby producing said enhanced image component.

6. The method according to claim 1, wherein:
    $H_k$ corresponds to the enhanced resolution key frame,
    $H_t$ corresponds to the enhanced resolution non-key frame,
    $H_k(\hat{y})$ corresponds to the enhanced image component incorporated in $H_k$,
    $\hat{H}_t(x)$ corresponds to the enhanced image component incorporated in $H_t$,
    $I_k(\hat{y})$ corresponds to the initial image component located in the one of the plurality of temporal frames of the received video image corresponding to $H_k$,
    $I_t(x)$ corresponds to the initial image component located in the other of the plurality of temporal frames of the received video image corresponding to $H_t$,
    $\hat{M}^{(t \to k)}(x)$ corresponds to the temporal motion signal from $I_t(x)$ to $I_k(\hat{y})$, and further wherein said step of locating said enhanced image component within the non-key frame corresponds to $\hat{H}_t(x)=H_k(\hat{y}), \hat{y}=\hat{M}^{(t\rightarrow k)}(x)$.

7. The method according to claim 1, wherein said step of locating said enhanced image component within the non-key frame further comprises the step of:
blending said enhanced image component with the initial image component of the other of the plurality of temporal frames of the received video image to produce a blended image component.

8. The method according to claim 7, further comprising the step of:
determining a motion accuracy estimation associated with said step of determining the movement of the initial image component, and wherein
said step of blending bends more of said enhanced image component with less of the initial image component of the other of the plurality of temporal frames of the initial video image in response to an increasing motion accuracy estimation.

9. The method according to claim 8, wherein:
$H_k$ corresponds to the enhanced resolution key frame,
$H_t$ corresponds to the enhanced resolution non-key frame,
$H_k(\hat{y})$ corresponds to the enhanced image component incorporated in $H_k$,
$\hat{H}_t(x)$ corresponds to the enhanced image component incorporated in $H_t$,
$I_k(\hat{y})$ corresponds to the initial image component located in the one of the plurality of temporal frames of the received video image corresponding to $H_k$,
$I_t(x)$ corresponds to the initial image component located in the other of the plurality of temporal frames of the received video image corresponding to $H_t$,
$\hat{M}^{(t\rightarrow k)}(x)$ corresponds to the temporal motion signal from $I_t(x)$ to $I_k(\hat{y})$,
$\omega_2$ corresponds to the motion accuracy estimation with respect to $\hat{M}^{(t\rightarrow k)}(x)$ and $\omega_1=1-\omega_2$, and further wherein said step of blending corresponds to $\hat{H}_t(x)=\omega_1 I_t(x)+\omega_2 H_k(\hat{y})$.

10. The method according to claim 1, further comprising the step of:
determining an error correction factor by analyzing an intensity of the initial image component at the one of the plurality of temporal frames of the initial video image and an intensity of the initial image component at the other of the plurality of temporal frames of the initial video image, and wherein said step of including further comprises the step of
applying the error correction factor to the enhanced image component within the non-key frame to produce a corrected image component.

11. The method according to claim 10, further comprising the step of:
determining a motion accuracy estimation associated with said step of determining the movement of the initial image component, and wherein
said step of applying the error correction factor to the enhanced image component within the non-key frame is only performed if the motion accuracy estimation is greater than a predetermined threshold indicating a substantially accurate motion accuracy estimation.

12. The method according to claim 10, wherein:
said step of determining the error correction factor determines the error correction factor to be substantially equivalent to a difference between the intensity of the initial image component at the one of the plurality of temporal frames of the initial video image and the intensity of the initial image component at the other of the plurality of temporal frames of the initial video image, and
said step of applying the error correction factor sums the error correction factor with an intensity of said enhanced image component within the non-key frame to produce the error corrected image component.

13. The method according to claim 12, wherein:
$H_k$ corresponds to the enhanced resolution key frame,
$H_t$ corresponds to the enhanced resolution non-key frame,
$H_k(\hat{y})$ corresponds to the enhanced image component incorporated in $H_k$,
$\hat{H}_t(x)$ corresponds to the enhanced image component included in $H_t$,
$\tilde{H}_t(x)$ corresponds to the error corrected image component included in $H_t$,
$I_k(\hat{y})$ corresponds to the initial image component located in the one of the plurality of temporal frames of the received video image corresponding to $H_k$,
$I_t(x)$ corresponds to of the initial image component located in the other of the plurality of temporal frames of the received video image corresponding to $H_t$,
said step of applying corresponds to $\tilde{H}_t(x)=\hat{H}_t(x)+I_t(x)-I_k(\hat{y})$.

14. The method according to claim 10, wherein:
said step of determining the error correction factor determines the error correction factor to be substantially equivalent to a product of a ratio of the intensity of said enhanced image component within the non-key frame with the intensity of the initial image component at the other of the plurality of temporal frames of the initial video image and a difference between the intensity of the initial image component at the one of the plurality of temporal frames of the initial video image and the intensity of the initial image component at the other of the plurality of temporal frames of the initial video image, and
said step of applying the error correction factor sums the error correction factor with an intensity of said enhanced image component within the non-key frame to produce the error corrected image component.

15. The method according to claim 14, wherein:
$H_k$ corresponds to the enhanced resolution key frame,
$H_t$ corresponds to the enhanced resolution non-key frame,
$H_k(\hat{y})$ corresponds to the enhanced image component incorporated in $H_k$,
$\hat{H}_t(x)$ corresponds to said enhanced image component included in $H_t$,
$\tilde{H}_t(x)$ corresponds to the error corrected image component included in $H_t$,
$I_k(\hat{y})$ corresponds to the initial image component located in the one of the plurality of temporal frames of the received video image corresponding to $H_k$,
$I_t(x)$ corresponds to the initial image component located in the other of the plurality of temporal frames of the received video image corresponding to $H_t$, and further wherein
said step of applying corresponds to $$\tilde{H}_t(x) = \hat{H}_t(x) + \frac{H_k(\hat{y})(I_t(x) - I_k(\hat{y}))}{I_k(\hat{y})}.$$

16. The method according to claim 1, further comprising the step of:
determining a motion accuracy estimation associated with said step of determining the movement of the initial image component, and wherein
said step of locating substitutes the initial image component of the other of the plurality of temporal frames of the received video image in place of said enhanced image component in response to the motion accuracy estimation being less than a predetermined threshold indicative of a substantially inaccurate motion accuracy estimation.

17. The method according to claim 16, wherein:
$H_k$ corresponds to the enhanced resolution key frame,
$H_t$ corresponds to the enhanced resolution non-key frame,
$H_k(\hat{y})$ corresponds to the enhanced image component incorporated in $H_k$,
$\hat{H}_t(x)$ corresponds to the enhanced image component to be incorporated in $H_t$,
$I_k(\hat{y})$ corresponds to the initial image component located in the one of the plurality of temporal frames of the received video image corresponding to $H_k$,
$I_t(x)$ corresponds to the initial image component located in the other of the plurality of temporal frames of the received video image corresponding to $H_t$,
$\hat{M}^{(t \to k)}(x)$ corresponds to the temporal motion signal from $I_t(x)$ to $I_k(\hat{y})$,
$\omega_2$ corresponds to the motion accuracy estimation with respect to $\hat{M}^{(t \to k)}(x)$
said step of locating corresponds to $\hat{H}_t(x)=I_t(x)$ if $\omega_2 \approx 0$.

18. A device for producing an enhanced video image from an initial video image, the device comprising:
a key frame generator for enhancing resolution of an initial image component common to a plurality of temporal frames of the initial video image by processing the plurality of frames of the initial video image to produce an enhanced image component, wherein the plurality of temporal frames of the enhanced video image includes a key frame corresponding to one of the plurality of temporal frames in the initial video image, the key frame generator further for substituting the enhanced image component within the key frame at a location corresponding to a location of the initial image component within the one of the plurality of frames of the initial video image;
a motion processor for determining a movement of the initial image component between the one of the plurality of temporal frames and another of the plurality of temporal frames of the initial video image corresponding to a non-key frame, and for producing a temporal motion signal in response thereto; and
a non-key frame generator coupled to said key frame generator for including the enhanced image component within the non-key frame of the plurality of temporal frames of the enhanced video image, the non-key frame generator further comprising:
a warping processor for locating the enhanced image component within the non-key frame in response to the location of the enhanced image component in the key frame and the temporal motion signal.

19. The device according to claim 18, wherein:
said motion processor further determines a motion accuracy estimation associated with the motion of the initial image component; and
said warping processor further blends the enhanced image component with the initial image component of the other of the plurality of initial temporal frames in response to the motion accuracy estimation, wherein more of the enhanced image component is blended with less of the initial image component of the other of the plurality of initial temporal in response to an increasing motion accuracy estimation.

20. The device according to claim 19, wherein said non-key frame processor further comprises:
an error correction processor for determining an error correction factor by analyzing an intensity of the initial image component at the one of the plurality of initial temporal frames and an intensity of the initial image component at the other of the plurality of initial temporal frames, and wherein
said warping processor applies the error correction factor to the enhanced image component to produce a corrected image component.

21. The device according to claim 20, wherein:
said error correction processor determines a motion accuracy estimation associated with the movement of the initial image component, and
said warping processor only applies the error correction factor to the enhanced image component if the motion accuracy estimation is greater than a predetermined threshold indicative of substantially accurate motion accuracy estimation.

22. The device according to claim 20, further wherein:
said error correction processor determines the error correction factor to be substantially equivalent to a difference between the intensity of the initial image component at the one of the plurality of temporal frames of the initial video image and the intensity of the initial image component at the other of the plurality of temporal frames of the initial video image, and
said warping processor sums the error correction factor with an intensity of said enhanced image component within the non-key frame to produce the error corrected image component.

23. The device according to claim 20, further wherein:
said error correction processor determines the error correction factor to be substantially equivalent to a product of a ratio of the intensity of said enhanced image component within the non-key frame with the intensity of the initial image component at the other of the plurality of temporal frames of the initial video image and a difference between the intensity of the initial image component at the one of the plurality of temporal frames of the initial video image and the intensity of the initial image component at the other of the plurality of temporal frames of the initial video image, and
said warping processor sums the error correction factor with an intensity of said enhanced image component within the non-key frame to produce the error corrected image component.

24. The device according to claim 18, wherein at least a portion of the device is incorporated into an electrical circuit detachably removably coupled between a signal source for generating the initial video image and a display for displaying the enhanced video image.

25. The device according to claim 18, wherein at least a portion of the device is incorporated into an integrated circuit specifically designed therefor.

26. The device according to claim 18, wherein at least a portion of the device is incorporated into a printed circuit board specifically designed therefor, wherein the printed circuit board is adapted for Insertion Into a standard connector associated with a personal computer for displaying the enhanced video image, and wherein at least another portion of the device operates with a microcomputer executing computer instructions, the microcomputer being an integral part of the personal computer, and further wherein the personal computer displays the initial video image in response to removal of said printed circuit board.

27. A computer readable medium including computer instructions for producing an enhanced video image from an initial video image, the computer instructions comprising instructions for:
  enhancing resolution of an initial image component common to a plurality of temporal frames of the initial video image by processing the plurality of frames of the received video image to produce an enhanced image component, wherein the plurality of temporal frames of the enhanced video image includes a key frame corresponding to one of the plurality of temporal frames of the initial video image;
  substituting said enhanced image component within the key frame at a location corresponding to a location of the initial image component within the one of the plurality of frames of the initial video image;
  determining a movement of the initial image component between the one of the plurality of temporal frames of the initial video image and another of the plurality of temporal frames of the initial video image corresponding to a non-key frame and producing a temporal motion signal in response thereto; and
  including said enhanced image component within the non-key frame of the plurality of temporal frames of the enhanced video image by locating said enhanced image component within the non-key frame in response to the location of the enhanced image component within the key frame and the temporal motion signal.

28. The computer readable medium according to claim 27, wherein the initial video image comprises a multiplicity of frames, each frame having a first pixel density, and the enhanced video image comprises a corresponding multiplicity of frames, each frame have a second pixel density at least twice the first pixel density.

29. The computer readable medium according to claim 27, wherein said instructions for enhancing further comprises instructions for:
  determining a motion of the image component between each of the plurality of temporal frames of the initial video image; and
  enhancing resolution of the initial image component in response thereto, thereby producing said enhanced image component.

30. The computer readable medium according to claim 27, wherein said instructions for locating said enhanced image component within the non-key frame further comprise instructions for:
  blending said enhanced image component with the initial image component of the other of the plurality of temporal frames of the received video image to produce a blended image component.

31. The computer readable medium according to claim 27, further comprising instructions for:
  determining a motion accuracy estimation associated with said instructions for determining the movement of the initial image component, and
  wherein
  said instructions for blending bends more of said enhanced image component with less of the initial image component of the other of the plurality of temporal frames of the initial video image in response to an increasing motion accuracy estimation.

32. The computer readable medium according to claim 27, further comprising instructions for:
  determining an error correction factor by analyzing an intensity of the initial image component at the one of the plurality of temporal frames of the initial video image and an intensity of the initial image component at the other of the plurality of temporal frames of the initial video image, and said instructions for including further includes instructions for
  applying the error correction factor to the enhanced image component within the non-key frame to produce a corrected image component.

33. The computer readable medium according to claim 32, further comprising instructions for:
  determining a motion accuracy estimation associated with said instructions for determining the movement of the initial image component, and wherein
  said instructions for applying the error correction factor to the enhanced image component within the non-key frame is only performed if the motion accuracy estimation is greater than a predetermined threshold indicating a substantially accurate motion accuracy estimation.

34. The computer readable medium according to claim 32, wherein:
  said instructions for determining the error correction factor determines the error correction factor to be substantially equivalent to a difference between the intensity of the initial image component at the one of the plurality of temporal frames of the initial video image and the intensity of the initial image component at the other of the plurality of temporal frames of the initial video image, and
  said instructions for applying the error correction factor sums the error correction factor with an intensity of said enhanced image component within the non-key frame to produce the error corrected image component.

35. The computer readable medium according to claim 32, further wherein:
  said instructions for determining the error correction factor determines the error correction factor to be substantially equivalent to a product of a ratio of the intensity of said enhanced image component within the non-key frame with the intensity of the initial image component at the other of the plurality of temporal frames of the initial video image and a difference between the intensity of the initial image component at the one of the plurality of temporal frames of the initial video image and the intensity of the initial image component at the other of the plurality of temporal frames of the initial video image, and
  said instructions for applying the error correction factor sums the error correction factor with an intensity of said enhanced image component within the non-key frame to produce the error corrected image component.

36. The computer readable medium according to claim 27, further comprising instructions for:
  determining a motion accuracy estimation associated with said instructions for determining the movement of the initial image component, and wherein said instructions for locating substitutes the initial image component of the other of the plurality of temporal frames of the received video image in place of said enhanced image component in response to the motion accuracy estimation being less than a predetermined threshold indicative of a substantially inaccurate motion accuracy estimation.

37. A display system for displaying an enhanced video image from an initial video image, comprising:
- a key frame generator for enhancing resolution of an initial image component common to a plurality of temporal frames of the initial video image by processing the plurality of frames of the initial video image to produce an enhanced image component, wherein the plurality of temporal frames of the enhanced video image includes a key frame corresponding to one of the plurality of temporal frames in the initial video image, the key frame generator further for substituting the enhanced image component into the key frame at a location corresponding to a location of the initial image component within the one of the plurality of frames of the initial video image;
- a non-key frame generator coupled to said key frame generator for incorporating the enhanced image component into a non-key frame of the plurality of temporal frames of the enhanced video image, the non-key frame corresponding to another of the plurality of initial temporal frames;
- a motion processor for determining a movement of the initial image component between the one of the plurality of temporal frames and another of the plurality of temporal frames of the initial video image corresponding to a non-key frame and for producing a temporal motion signal in response thereto;
- a warping processor for locating the enhanced image component within the non-key frame in response to the location of the enhanced image component in the key frame and the temporal motion signal; and
- a display apparatus coupled to said non-key frame generator for displaying the enhanced video image.

38. The display system according claim 37, wherein said display apparatus includes a display and corresponding display drivers.

* * * * *